(12) United States Patent
Stevenson et al.

(10) Patent No.: US 10,570,823 B2
(45) Date of Patent: Feb. 25, 2020

(54) HEAT RECOVERY UNIT AND POWER PLANT

(71) Applicant: Stork Thermeq B.V., Hengelo (NL)

(72) Inventors: Eric Robert Stevenson, Lekkerkerk (NL); Stephan Cornelis Gerardus Bergmans, Enschede (NL)

(73) Assignee: Stork Thermeq B.V., Hengelo (NL)

( * ) Notice: Subject to any disclaimer, the term of this patent is extended or adjusted under 35 U.S.C. 154(b) by 344 days.

(21) Appl. No.: 15/513,171

(22) PCT Filed: Sep. 24, 2015

(86) PCT No.: PCT/EP2015/071950
§ 371 (c)(1),
(2) Date: Mar. 22, 2017

(87) PCT Pub. No.: WO2016/046305
PCT Pub. Date: Mar. 31, 2016

(65) Prior Publication Data
US 2017/0298820 A1    Oct. 19, 2017

(30) Foreign Application Priority Data

Sep. 26, 2014 (EP) .................................. 14186586

(51) Int. Cl.
| | |
|---|---|
| *F02C 6/18* | (2006.01) |
| *F22B 31/04* | (2006.01) |
| *F01K 3/24* | (2006.01) |
| *F22G 1/16* | (2006.01) |
| *F22B 21/00* | (2006.01) |

(Continued)

(52) U.S. Cl.
CPC ................ *F02C 6/18* (2013.01); *F01D 15/10* (2013.01); *F01K 3/24* (2013.01); *F01K 23/10* (2013.01);

(Continued)

(58) Field of Classification Search
CPC .... F01K 23/101; F01K 23/103; F01K 23/105; F01K 23/106; F01K 23/10; F01K 3/24;

(Continued)

(56) References Cited

U.S. PATENT DOCUMENTS 5,632,143 A * 5/1997 Fisher ..................... F01K 23/10
                                                              60/39.181
6,141,956 A * 11/2000 Iijima ................... F22B 1/1815
                                                              122/7 R (Continued)

FOREIGN PATENT DOCUMENTS

| EP | 0325083 A1 | 7/1989 |
|---|---|---|
| EP | 0753701 A1 | 1/1997 |

(Continued)

*Primary Examiner* — Craig Kim
(74) *Attorney, Agent, or Firm* — Hoffman & Baron, LLP

(57) ABSTRACT

A heat recovery unit for generating a heated fluid by a hot exhaust gas includes a housing having an inlet for introducing hot exhaust gas and an outlet for discharging treated exhaust gas, and arranged in the housing at least one heat exchanger for heat exchange between the hot exhaust gas and a fluid, and an auxiliary combustor for combusting fuel with hot exhaust gas. The auxiliary combustor is provided with a fuel supply, which auxiliary combustor is arranged downstream of the at least one heat exchanger in the housing. An exhaust gas bypass for a part of the hot exhaust gas is provided, having an inlet for exhaust gas, and being positioned upstream of the at least one heat exchanger, and having an outlet in direct fluid communication with the auxiliary combustor.

14 Claims, 4 Drawing Sheets

(51) Int. Cl.
*F22B 37/40* (2006.01)
*F01D 15/10* (2006.01)
*F01K 23/10* (2006.01)
*F02C 3/04* (2006.01)
*F02C 7/22* (2006.01)

(52) U.S. Cl.
CPC ............... *F02C 3/04* (2013.01); *F02C 7/22* (2013.01); *F22B 21/00* (2013.01); *F22B 31/04* (2013.01); *F22B 37/40* (2013.01); *F22G 1/16* (2013.01); *F05D 2220/32* (2013.01); *F05D 2220/72* (2013.01); *F05D 2220/76* (2013.01); *F05D 2240/35* (2013.01); *Y02E 20/14* (2013.01); *Y02E 20/16* (2013.01); *Y02P 80/154* (2015.11)

(58) Field of Classification Search
CPC .. F02C 6/18; F22B 21/00; F22B 31/04; F22B 37/40; F22G 1/16
See application file for complete search history.

(56) References Cited

U.S. PATENT DOCUMENTS

| | | | | |
|---|---|---|---|---|
| 6,298,655 | B1* | 10/2001 | Lee | F01D 25/30 60/39.182 |
| 9,222,410 | B2* | 12/2015 | Chillar | F02C 6/08 |
| 2003/0010012 | A1 | 1/2003 | Brandon | |
| 2004/0045300 | A1* | 3/2004 | Dovali-Solis | F02C 6/18 60/778 |
| 2010/0305768 | A1* | 12/2010 | Holt | F01K 13/02 700/288 |
| 2014/0090356 | A1 | 4/2014 | Nakamura et al. | |

FOREIGN PATENT DOCUMENTS

| | | |
|---|---|---|
| GB | 879032 | 10/1961 |
| GB | 1108825 | 4/1968 |
| WO | 2007/090692 A2 | 8/2007 |

\* cited by examiner

HEAT RECOVERY UNIT AND POWER PLANT

CROSS-REFERENCE TO RELATED APPLICATIONS

This application is the National Stage of International Application No. PCT/EP2015/071950 filed Sep. 24, 2015, which claims the benefit of European Application No. EP 14186586.5, filed Sep. 26, 2014, the contents of which is incorporated by reference herein.

FIELD OF THE INVENTION

The present invention relates to a heat recovery unit and a power plant comprising such a heat recovery steam generator.

BACKGROUND OF THE INVENTION

US 2014/0090356 A1 has disclosed a heat recovery steam generator having a plurality of heat exchangers, including a so called superheater, an evaporator and an economizer. The heat exchangers are arranged in a housing (i.e. a duct section) in the flow direction of an exhaust gas from a gas turbine. Steam is generated utilizing the heat of the hot turbine exhaust gas. This known heat recovery steam generator further comprises auxiliary combustors, which are each disposed upstream of one of the heat exchangers, for further heating the exhaust gas by means of burners. An air supply device for additionally supplying air to the burners of at least one of the auxiliary combustors, in particular the most downstream one, from the outside of the duct is also provided. In an embodiment shown a second-stage auxiliary combustor is positioned as seen in the direction of flow of the turbine exhaust gas downstream of a first-stage auxiliary combustor. A high-temperature and a low-temperature superheater for generating steam are positioned between the auxiliary combustors. Both combustors are fed with fuel. As the oxygen content in the exhaust gas downstream of the first-stage combustor may be insufficient for a stable combustion at the second-stage auxiliary combustor additional air is fed to the second-stage auxiliary combustor by means of a fan and suitable ducting. The amount of air to each burner of the second-stage combustor is individually controlled by air control valves. According to this patent document in this way it is possible to maintain an optimal combustion state at the second-stage combustor.

For a stable combustion both temperature and oxygen content are significant parameters. The lower the temperature, the higher the oxygen concentration should be. And the lower the oxygen content, the higher the temperature. In the heat recovery steam generator the ratio of oxygen to temperature is increased by the introduction of fresh air having an oxygen content of about 17-21% compared to an oxygen content of about 8-16% in the turbine exhaust gas.

A drawback of this known heat recovery steam generator is that relatively cold air is introduced, which needs to be heated to the appropriate combustion temperature by the hot exhaust gas, which reduces the efficiency. Thus the efficiency of the heat recovery system leaves something to be desired. Furthermore the expenses of the air fan and associated air supply system and equipment and its operation add to the total costs and require additional electrical power. Furthermore failure of this air fan and associated equipment might result in interruption of the operation of the heat recovery steam generator.

SUMMARY OF THE INVENTION

The present invention aims at providing a heat recovery unit that does not show these drawbacks, at least to a lesser extent, or a suitable alternative.

More specifically an object of the invention is to provide a heat recovery unit having an optimized combustion performance at high efficiency.

According to the invention a heat recovery unit for generating a heated fluid by a hot exhaust gas comprises:
a housing having an inlet for introducing hot exhaust gas and an outlet for discharging treated exhaust gas, and arranged in said housing
at least one heat exchanger for heat exchange between the hot exhaust gas and a fluid, and
an auxiliary combustor for combusting fuel with hot exhaust gas, the auxiliary combustor being provided with a fuel supply, which auxiliary combustor is arranged downstream of the at least one heat exchanger in said housing,
wherein an exhaust gas bypass for a part of the hot exhaust gas is provided, having an inlet for exhaust gas, and being positioned upstream of the at least one heat exchanger, and having an outlet in direct fluid communication with the auxiliary combustor.

The heat recovery unit according to the invention comprises a housing, such as a tube section, having an inlet for entering hot exhaust gas and an outlet for discharging exhaust gas from which heat has been recovered. Typically during operation the inlet is connected to a discharge of a hot exhaust gas generating device, such as a gas turbine or combustion engine, wherein typically a fuel like (natural) gas, naphtha or oil is fired. Another example of a hot exhaust gas generating device is process equipment of an industrial plant, wherein hot exhaust gas is produced. These devices produce a relatively clean and hot exhaust gas. Typically the amount of oxygen contained in the exhaust gas is about 8-16%. In the housing between the inlet and outlet—as seen in the direction of the main flow of the exhaust gas—at least one heat exchanger and an auxiliary combustor are mounted. In the heat exchanger heat is transferred from the hot exhaust gas to a fluid to be heated (typically a flow of water and/or steam). In the auxiliary combustor downstream of the heat exchanger the exhaust gas is used as combustion air and combusted with fuel fed to the auxiliary combustor. Then the thus treated exhaust gas leaves the outlet of the housing.

According to the invention a part of the hot exhaust gas that is produced in the hot exhaust gas generating device bypasses the heat exchanger (and if applicable a first stage combustor as will be explained hereinafter) and is directly fed to the auxiliary combustor for ignition and stabilisation of its flame. Bypassing the heat exchanger serves several purposes. First, due to heat exchange the temperature of the main flow of hot exhaust gas will be reduced. As a consequence optimal combustion of the heat exchanged exhaust gas in the auxiliary combustor may be difficult to achieve at the given oxygen concentration of 8-16%. By introducing a partial bypass flow of hot exhaust gas in the auxiliary combustor sufficient heat in view of the required temperature at the prevailing oxygen conditions is provided allowing a stable flame configuration substantially using the bypass flow and complete combustion of the exhaust gas as a whole. Thus, the auxiliary combustor is fired using the bypassed hot exhaust gas without prior mixing the bypassed hot exhaust gas and heat exchanged hot exhaust gas upstream of the auxiliary combustor. Secondly, feeding relatively cold air from the environment is superfluous as the oxygen content of the bypass flow is high enough to allow combusting fuel in the auxiliary combustor, even if the heat exchanger is preceded with an upstream combustor (first stage combustor) as will be explained later on. Thus in such a situation the bypassed exhaust gas replaces all or most of the fresh air from the environment and none or minimum heat and additional electrical power is lost for heating and adding the cold fresh air. E.g. some type of burners may need some fresh air for a smooth operation. Also an air fan and associated equipment can be dispensed with. Thus the bypassed hot exhaust gas can be used for optimizing the firing conditions in the auxiliary combustor with respect to both temperature and oxygen content.

In case the heat exchanger comprises several heat exchanging subdevices and provided the conditions of the hot exhaust gas like pressure, temperature and oxygen content allow, the inlet of the bypass may be arranged between these subdevices.

The heated fluid such as superheated high pressure steam, low pressure steam, hot water and combinations thereof, thermal oil or other heated medium will be further processed and/or used depending on the total plant, wherein the heat recovery unit according to the invention is installed. The heat recovery unit can be used with any hot exhaust gas regardless its origin. The heat recovery unit according to the invention is typically used in a thermal power plant operated in cogeneration mode or combined cycle mode, wherein either process steam or hot water is produced, that can be used in a factory, either high temperature, high pressure steam which is used for driving a steam turbine.

The bypass can be arranged in the housing as an internal bypass, as an external bypass outside the housing or a combination thereof, depending on the type of installation. If the auxiliary combustor comprises rows of multiple burners, an external bypass is advantageous. In case of circular burners, an internal bypass may be a possible configuration. The position of the bypass, whether internal or external, will be dependent of the type of installation and associated requirements. E.g. the bypass may be provided at the roof, bottom or side wall(s) and combinations thereof.

For ease of construction regarding thermal isolation and thermal expansion, as well as space for the fuel supply the bypass is arranged outside the housing and spaced apart from the outer periphery thereof. In a preferred embodiment the exhaust gas bypass comprises at least one bypass channel having its inlet upstream of the heat exchanger, and its outlet connected to a manifold for distribution of the bypassed exhaust gas over the auxiliary combustor directly, which auxiliary combustor typically comprises a number of burners, e.g. a matrix configuration of several vertically spaced apart rows of multiple burners.

Preferably, the ducting, manifold(s) and baffling of the bypass direct the bypassed exhaust gas directly to the auxiliary combustor for ignition and stabilisation of the flame. In a further embodiment downstream the heat exchanger means are arranged for directing the exhaust gas to the auxiliary combustor downstream of the ignition and flame stabilisation zone. Suitable means include ducting, as well as supply through flow baffles. Supply by using flow baffles is particularly preferred. As the thermal (and oxygen) conditions of the bypassed exhaust gas are more appropriate for stable combustion than those of the exhaust gas that has passed the heat exchanger and optionally another upstream combustor, as will be explained hereinafter, in the auxiliary combustor fuel is first fired with the bypassed exhaust gas and then complete combustion is achieved using the heat treated exhaust gas.

Control equipment, such as actively controlled flow valves, may be present in order to control the distribution of the hot exhaust gas in a main flow and a bypass flow depending on the (burner) load. Both flows may be controlled. Controlling the bypass flow is preferred over controlling the main flow.

In an embodiment of the heat recovery unit according to the invention it is designed such that the flow resistance for the main flow of the hot exhaust gas is sufficient to create a bypass flow without using additional fan means and/or actively controlled flow control means, like control valves. In a preferred embodiment a flow conditioner for conditioning the turbulent flow of hot exhaust gas, typically used to reduce the rotary velocity component (swirl) of the exhaust gas leaving the gas turbine, in combination with the heat exchanger provides the required flow resistance, while the bypass is essentially free of such apparatuses. The inlet of the bypass is advantageously arranged upstream of the flow conditioner.

In an embodiment having two or more combustors comparable to the heat recovery steam generator of US 2014/0090356 A1, upstream of the heat exchanger a further upstream combustor (first stage auxiliary combustor) for combusting exhaust gas is positioned in the housing having a fuel supply, and the inlet of the bypass is positioned upstream of the further upstream combustor. In this situation the main flow of hot exhaust gas will have its oxygen content further reduced, e.g. typically to 10% or less, due to combustion of fuel in the upstream combustor. Typically such a low oxygen content is insufficient to provide a stable combustion at the prevailing temperature conditions. In this embodiment the bypassed exhaust gas functions as primary oxygen source for combusting the fuel in the auxiliary combustor and as a heating medium for the main stream of hot exhaust gas that has been treated in the upstream combustor and the heat exchanger.

If the conditions (temperature, oxygen content and pressure) of the exhaust gas of the upstream combustor allow, the inlet of the bypass may be arranged downstream the upstream combustor and ahead of the heat exchanger.

The further upstream combustor within the housing may also function as the source of hot exhaust gas, e.g. when it is fed with fuel and fresh air from outside, the generated hot exhaust gas of which is diverted into a main hot exhaust gas stream flowing to the heat exchanger and auxiliary combustor and a bypass flow bypassing the heat exchanger.

Typically in the embodiment having two combustors in the heat recovery unit according the invention a further heat exchanger is provided downstream of the auxiliary combustor.

The invention also relates to a thermal power plant for generating electricity in combined cycle mode, comprising a gas turbine driven by a high-temperature, high-pressure combustion gas and generating a hot exhaust gas,
a heat recovery unit according to the invention described above,
a steam turbine driven by steam produced in the heat recovery steam generator, and
a generator for generating electricity driven by the gas turbine and the steam turbine.

A further aspect of the invention is a thermal power plant for generating electricity and steam in co-generation mode, comprising:
a gas turbine driven by a high-temperature, high-pressure combustion gas and generating a hot exhaust gas,
a generator for generating electricity driven by the gas turbine a heat recovery unit according to the invention described above
wherein the heat recovery unit is connected to a process line of steam for further processing, e.g. plant facilities to which the power plant belongs.

The advantages and features of the invention described above are similarly applicable to these thermal power plant embodiments.

BRIEF DESCRIPTION OF THE DRAWINGS

Hereinafter the invention is illustrated by the drawings, wherein.

DETAILED DESCRIPTION OF THE INVENTION

Figure 1:
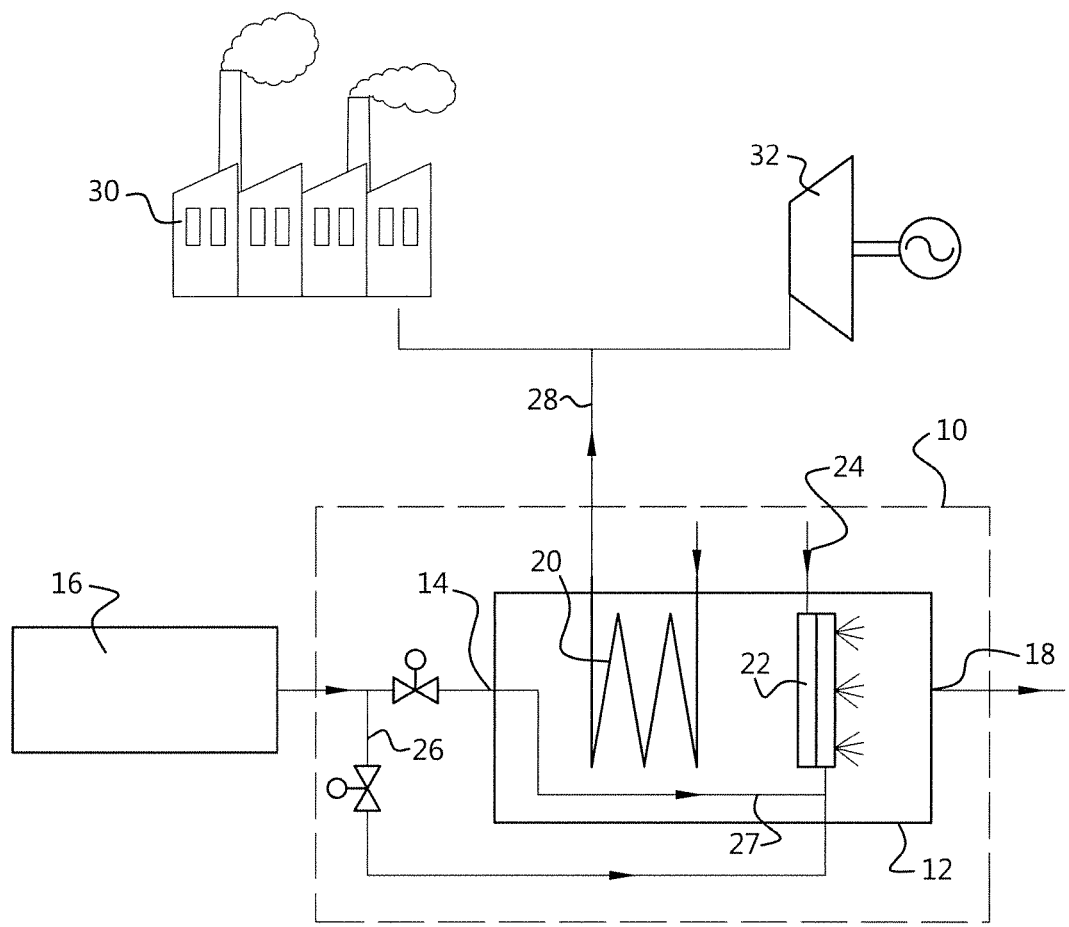
FIG. 1 is a basic flow design of a heat recovery unit according to the invention.

In FIG. 1 a diagrammatic representation of the basic design of a heat recovery unit according to the invention is shown in combination with a hot exhaust gas generating device and possible applications for the heated fluid. The heat recovery unit is indicated in its entirety (also illustrated by a rectangular in broken lines) by reference numeral 10. The heat recovery unit 10 comprises a housing 12 such as a tube section, having an upstream inlet 14 for introducing hot exhaust gas from a hot exhaust gas producing device 16. At the downstream end the housing 12 is provided with an outlet 18 such as a stack, for discharging treated exhaust gas. In the housing 12 a heat exchanger 20 is arranged and downstream thereof an auxiliary combustor 22, which is fed with fuel via fuel supply line 24. The hot exhaust gas from the device 16 is diverted in a main stream flowing into the inlet 14 and a bypass stream passing via external bypass 26 outside the housing 12 and internal bypass 27 inside the housing to the auxiliary combustor 22, where it is combusted with the fuel. In the heat exchanger 20 heat from the hot exhaust gas is transferred to a heat exchange fluid, typically a flow of water and/or steam or (thermal) oil. The thus heated fluid exits the heat exchanger 20 via a discharge conduit 28, e.g. hot water and/or low pressure steam or heated oil to be used in for example a factory 30, or as high-temperature, high-pressure steam in a steam turbine 32. As shown, control valves 34 and/or 36 may be provided to control the flow of the bypassed exhaust gas in bypasses 26 and 27 in relation to the main flow.

Figure 2:
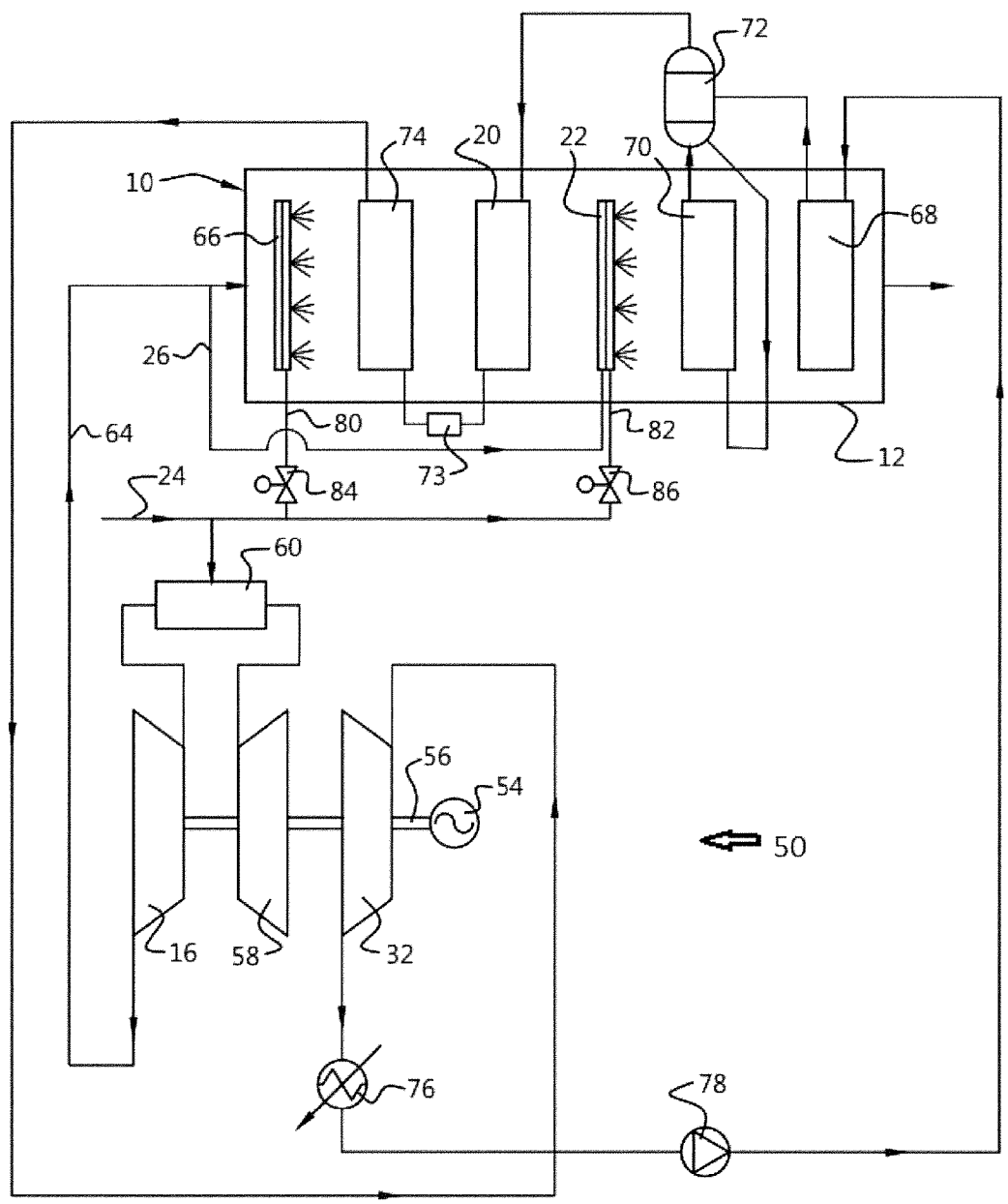
FIG. 2 shows an embodiment of a thermal power plant having a heat recovery unit according to the invention in combined cycle mode.

FIG. 2 shows an embodiment of a thermal power plant 50 with a heat recovery unit 10 according to the invention. In this FIG. 2 components and parts similar to those of FIG. 1 bear the same reference numerals.

The thermal power plant 50 comprises a gas turbine 16 as a hot exhaust gas producing device, and a steam turbine 32, which are both coupled to a power generator 54 by a common drive shaft 56. The gas turbine and steam turbine may also have their own driving shaft with power generator. Reference numeral 58 represents an air compressor driven by the same shaft 56, wherein air taken from the environment is compressed. The compressed air is fed to combustor 60. Fuel fed from fuel supply line 24 is also introduced into the combustor 60. In the combustor 60 the fuel and compressed air are fired, resulting in a high-pressure, high-temperature combustion gas that is passed to the gas turbine 16. Hot exhaust gas exits the gas turbine 16 via conduit 64 and is fed to a heat recovery unit 10. In this embodiment the heat recovery unit 10 comprises two combustors, an upstream combustor 66 (first stage auxiliary combustor) and an auxiliary combustor 22 (second stage auxiliary combustor). Downstream the auxiliary combustor 22 an economiser 68 for preheating water and an evaporator 70 for generation of steam and provided with a steam drum 72 for separation of steam from the evaporator 70 and water from the economiser 68 are arranged. Water separated in the steam drum 72 is returned to the evaporator 70. On its turn steam separated in the steam drum 72 is fed to heat exchanger 20, in this embodiment a low-temperature superheater, and then via temperature adjuster 73 to a high-pressure superheater 74 for further heating. The thus generated steam is fed to the steam turbine 52 for driving the power generator 54. The steam thus utilized is condensed in condenser 76 and by means of pump 78 returned to the economiser 68.

The upstream combustor 66 and auxiliary combustor 22 are provided with fuel from fuel supply line 24 via branch lines 80 and 82 respectively having control valves 84 and 86.

As said, the hot exhaust gas of the gas turbine 16 is introduced in the inlet 14 of the housing 12. As seen in the direction of flow of the hot exhaust gas, the upstream combustor 66 arranged upstream of the superheaters 74 and 20 burns the supplied fuel with the hot exhaust gas thereby heating the hot exhaust gas for heat exchange in the superheaters for generating superheated steam. Due to this combustion and the subsequent heat exchange the hot exhaust gas will have its oxygen content reduced, as well as its temperature lowered. Operation of the auxiliary combustor 22 downstream these superheaters raises the temperature of the exhaust gas enabling steam generation in the evaporator 70 and preheating in the economiser 68. The auxiliary combustor 22 is fed with fuel from the fuel supply line 24 via branch line 82. As shown, part of the hot exhaust gas from the gas turbine 16 passes into the bypass 26 thereby bypassing the upstream combustor 66 and heat exchangers 74 and 20. As the oxygen content of the bypassed exhaust gas is unchanged with respect to the hot exhaust gas entering the heat recovery unit 10 the bypassed exhaust gas allows for combustion of fuel in the auxiliary combustor 22 without supplying fresh air from the environment. Also the temperature of the bypassed exhaust gas is substantially maintained enabling a stable combustion at the required temperature conditions.

Figure 3:
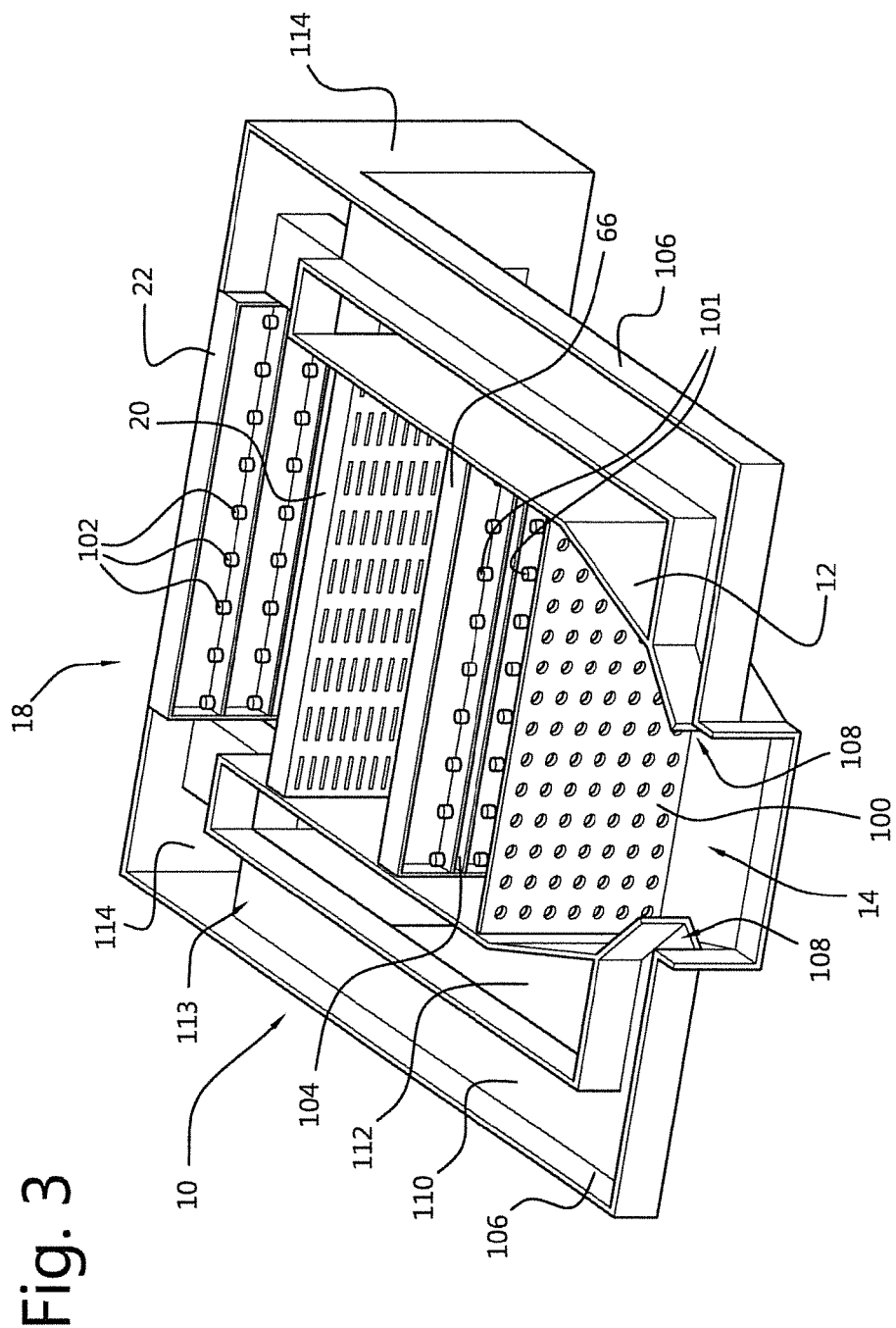
FIGS. 3-5 show an embodiment of heat recovery unit according to the invention.
Figure 4:
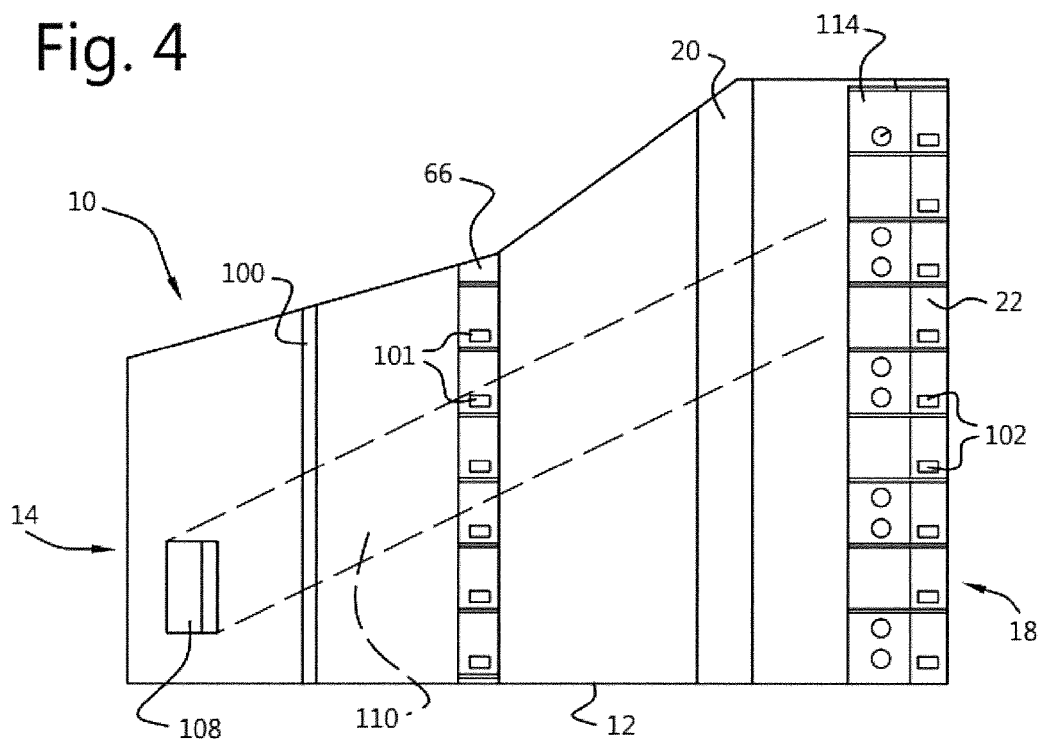
Figure 5:
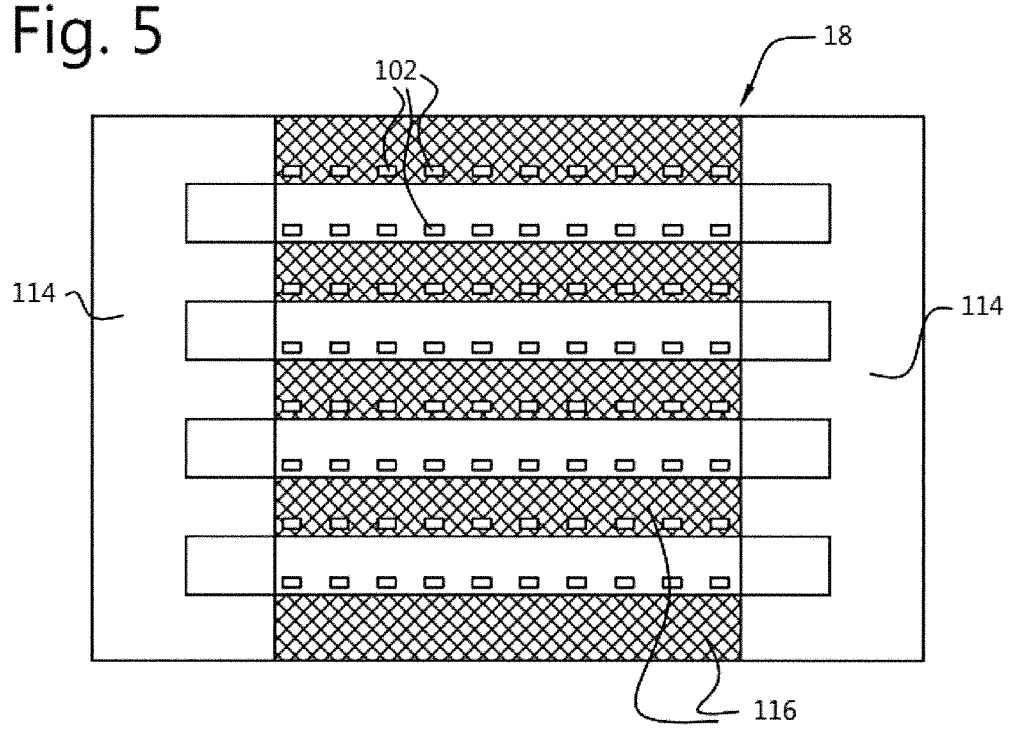

FIG. 3-5 show an embodiment of a heat recovery unit 10 according to the invention. In FIG. 3 an open diagrammatic view is drawn. FIG. 4 is a longitudinal cross-section. FIG. 5 shows a back view.

In these Figs. the (insulated) housing 12 has an inlet 14 for entry of hot exhaust gas. Typically the inlet 14 will be directly mounted to the exhaust gas outlet of a gas turbine. Downstream the inlet 14 a flow conditioner 100, typically a perforated screen like a metal sheet having a plurality of openings from one side to the other, is provided. An upstream combustor 66 having a number of vertically spaced apart rows of burners 101 is arranged downstream of the flow conditioner. Between the rows suitable gas permeable baffle plates 104 for directing the hot exhaust gas are provided. The burners 102 are fed with fuel via suitable ducting (not shown in these Figs.). Instead of a line burner assembly, other types of burners, such as circular burner(s) can also be used The hot exhaust gas passes through the upstream combustor 66 towards a heat exchanger 20, where heat from the hot exhaust gas is transferred to a heat exchange fluid. At the outlet 18 of the housing 12 an auxiliary combustor 22 fed with fuel (again not shown) is arranged. A thermally insulated bypass channel 106 having an inlet 108 for hot exhaust gas is arranged adjacent the inlet 14 of the housing 12 and at each side of the inlet 14. If required, expansion bellows (not shown) may be provided in the bypass. The bypass channel section 110 is substantially spaced apart from the outer periphery 112 of the housing 12. Near the outlet 18 of the housing 12 where the auxiliary combustor 22 is arranged, each outlet 113 of a bypass channel 106 ends in a bypass manifold 114 for distributing the bypassed exhaust gas over the vertically spaced apart rows of burners 102 via additional ducting. As is shown diagrammatically, the bypassed exhaust gas is directed to the burners 102 directly, while the main flow of exhaust gas flows through baffle plates 116, which are gas permeable (indicated by hatching) to the downstream side of the burners 102 for complete combustion. The various apparatuses mounted in the housing 12 provide for sufficient flow resistance forcing a partial flow of hot exhaust gas into the bypass channels 106 and for forced draw of the partial flow by the auxiliary combustor 22.

The invention claimed is:

1. A heat recovery unit for generating a heated fluid by a hot exhaust gas, comprising:
   a housing having an inlet for introducing the hot exhaust gas from a hot exhaust gas generating device and an outlet for discharging outlet exhaust gas from the housing, and arranged in said housing,
   at least one heat exchanger for heat exchange between the hot exhaust gas and a fluid, and
   an auxiliary combustor for combusting a fuel with the hot exhaust gas from the at least one heat exchanger, the auxiliary combustor being provided with a fuel supply, which auxiliary combustor is arranged downstream of the at least one heat exchanger in said housing,
   wherein an exhaust gas bypass for a partial bypass flow of the hot exhaust gas is provided, having an inlet for a portion of the hot exhaust gas, which inlet is positioned upstream of the at least one heat exchanger, and having an outlet in direct fluid communication with the auxiliary combustor, such that the auxiliary combustor is ignited using the partial bypass flow of the hot exhaust gas without prior mixing the partial flow of the hot exhaust gas and the hot exhaust gas from the at least one heat exchanger upstream of the auxiliary combustor.

2. The heat recovery unit according to claim 1, wherein, downstream of the at least one heat exchanger means are arranged for directing the hot exhaust gas from the at least one heat exchanger to the auxiliary combustor downstream of an ignition and flame stabilisation zone of the auxiliary combustor.

3. The heat recovery unit according to claim 1, wherein the exhaust gas bypass is arranged outside the housing and spaced apart from the outer periphery thereof.

4. The heat recovery unit according to claim 1, wherein the exhaust gas bypass is arranged inside the housing.

5. The heat recovery unit according to claim 1, wherein the exhaust gas bypass comprises at least one bypass channel having its inlet upstream of the at least one heat exchanger and its outlet connected to a manifold for distribution of the partial bypass flow of the hot exhaust gas over the auxiliary combustor.

6. The heat recovery unit according to claim 1, wherein the exhaust gas bypass is without a flow control device.

7. The heat recovery unit according to claim 1, wherein the auxiliary combustor comprises burners and wherein baffling means for directing the hot exhaust gas from the at least one heat exchanger to the auxiliary combustor downstream of the burners thereof are provided.

8. The heat recovery unit according to claim 1, wherein a flow conditioner for conditioning the flow of the hot exhaust gas is arranged upstream of the at least one heat exchanger in the housing.

9. The heat recovery unit according to claim 1, wherein upstream of the at least one heat exchanger, an upstream combustor for combusting fuel with hot exhaust gas is positioned in the housing, having a fuel supply, and the inlet of the exhaust gas bypass is positioned upstream of the upstream combustor.

10. The heat recovery unit according to claim 1, further comprising at least one additional heat exchanger which is provided downstream of the auxiliary combustor.

11. The heat recovery unit according to claim 1, wherein the hot exhaust gas comprises oxygen, wherein the hot exhaust gas generating device for producing the hot exhaust gas comprises an exhaust gas discharge, wherein the inlet of the housing is connected to the exhaust gas discharge of the hot exhaust gas generating device.

12. The heat recovery unit according to claim 11, wherein the hot exhaust gas generating device is a gas turbine.

13. A thermal power plant for generating electricity in combined cycle mode, comprising:
   the heat recovery unit according to claim 1 for generating steam by the hot exhaust gas from a gas turbine, wherein the hot exhaust gas generating device is thea gas turbine driven by a high-temperature, high-pressure combustion gas and generating the hot exhaust gas,
   a steam turbine driven by steam produced in the heat recovery unit, and
   a generator for generating electricity driven by the gas turbine and the steam turbine.

14. A thermal power plant for generating electricity and steam in co-generation mode, comprising:
   a heat recovery unit according to claim 1 for generating steam by the hot exhaust gas from a gas turbine, wherein the hot exhaust gas generating device is the gas turbine driven by a high-temperature, high-pressure combustion gas and generating the hot exhaust gas, and
   a generator for generating electricity driven by the gas turbine,
   wherein the heat recovery unit is connected to a process line of steam for further processing thereof.

* * * * *